(12) United States Patent
Pekarsky et al.

(10) Patent No.: US 7,998,347 B2
(45) Date of Patent: Aug. 16, 2011

(54) SUCTION FILTER FOR AUTOMATIC TRANSMISSION FLUID

(75) Inventors: Lev Pekarsky, West Blommfield, MI (US); Robb D. Pratt, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 652 days.

(21) Appl. No.: 12/128,837

(22) Filed: May 29, 2008

(65) Prior Publication Data

US 2009/0294343 A1 Dec. 3, 2009

(51) Int. Cl.
- B01D 35/00 (2006.01)
- B01D 29/11 (2006.01)
- B01D 29/52 (2006.01)
- B01D 29/00 (2006.01)
- F01M 11/03 (2006.01)

(52) U.S. Cl. ............. 210/253; 210/167.01; 210/167.04; 210/167.08; 210/172.4; 210/259; 210/262; 210/314; 210/317; 210/340; 210/346

(58) Field of Classification Search .................. 210/132, 210/167.08, 314, 317, 346, 340

See application file for complete search history.

(56) References Cited

U.S. PATENT DOCUMENTS

| | | | |
|---|---|---|---|
| 4,136,011 A | 1/1979 | Joseph et al. | |
| 4,402,827 A | 9/1983 | Joseph | |
| 4,414,172 A | 11/1983 | Leason | |
| 4,828,694 A * | 5/1989 | Leason | 210/167.08 |
| 5,049,274 A | 9/1991 | Leason et al. | |
| 5,494,575 A | 2/1996 | Kitajima et al. | |
| 5,538,633 A | 7/1996 | Kitajima et al. | |
| 5,817,236 A | 10/1998 | Chiba | |
| 6,451,205 B1 | 9/2002 | McGaw, Jr. | |
| 7,083,722 B2 | 8/2006 | McGaw, Jr. | |
| 7,087,160 B2 | 8/2006 | Beer et al. | |
| 7,357,865 B1 * | 4/2008 | Nader | 210/232 |
| 2003/0006179 A1 * | 1/2003 | Caldwell | 210/168 |
| 2003/0201216 A1 * | 10/2003 | Wolford et al. | 210/130 |
| 2005/0087481 A1 * | 4/2005 | Boast et al. | 210/130 |
| 2009/0250410 A1 * | 10/2009 | Khalil et al. | 210/767 |

FOREIGN PATENT DOCUMENTS

EP 1588753 10/2005

* cited by examiner

*Primary Examiner* — Benjamin Kurtz
(74) *Attorney, Agent, or Firm* — David B. Kelley; MacMillan, Sobanski & Todd, LLC

(57) ABSTRACT

An assembly for filtering contaminants from automatic transmission fluid includes a housing including a first inlet and a second inlet, through which fluid enters the housing, and an outlet, through which fluid exits the housing; a first media filter located within the housing in a first fluid flow path between the first inlet and the outlet; and a second media filter located within the housing in a second fluid flow path between the second inlet and the outlet.

19 Claims, 4 Drawing Sheets

SUCTION FILTER FOR AUTOMATIC TRANSMISSION FLUID

BACKGROUND OF THE INVENTION

1. Field of the Invention

This invention relates generally to a suction filter with multiple filtration elements that are fed from multiple inlets for an automatic transmission.

2. Description of the Prior Art

A simple transmission suction filter has a single media layer that is crimped on the edges between the housing flanges. This design has an inherit weaknesses: its overall capacity balanced against its efficiency and pressure drop. As more efficient media have higher flow resistance, i.e., lower permeability, a single media layer filter must be quite larger to handle the required transmission flow without having an excessive pressure drop at cold temperatures when the viscosity of the transmission fluid is highest.

Most transmission suction filters use a bag filter media arrangement, which provide higher media packaging density. This allows an increased area for fluid flow, which results in a lower pressure drop and higher dirt holding capacity while maintaining high efficiency. Furthermore, bag filters can be designed to take up less overall area due to their multiple layers of contact. They do, however, require a greater thickness to support the bag arrangement.

Bag filters have been further refined to improve performance, as U.S. Pat. No. 5,049,274 discloses. There the filter element was changed to an impregnated felt that was folded into a bag and crimped on the edges between two flanges. A hole in the lower portion of the folded bag was sealed on the edges and connected to the filter suction inlet.

An alternative used in a few transmissions employs a pleated, non-planar filter element design described in European Patent EP1588753A1. A pleated design provides an increased filter media packaging density. The tradeoff, however, is two fold: a pleated filter is more expensive to manufacture, but pleated technology allows only a rectangular housing configuration.

A need exists in the industry for a suction filter that provides high media packaging density, high dirt holding capacity, high filtration efficiency, packaging flexibility for irregular shaped housings, and low cost

SUMMARY OF THE INVENTION

A suction assembly for filtering contaminants from automatic transmission fluid includes a housing including a first inlet and a second inlet, through which fluid enters the housing, and an outlet, through which fluid exits the housing; a first media filter located within the housing in a first fluid flow path between the first inlet and the outlet; and a second media filter located within the housing in a second fluid flow path between the second inlet and the outlet.

The suction filter that provides high media packaging density, high dirt holding capacity, high filtration efficiency, packaging flexibility for irregular shaped housings, and low cost A coarse filtering media is created with a bag filter, which communicates with a centrally located fluid inlet. A high efficiency filtering media comprises a single media layer, which is located between the bag filter and the bottom of the filter housing and is supplied through a series of smaller inlet holes arranged around the circumference of the bag filter inlet.

A molded separator grid, located between the bag filter and the single layer, comprises vertical ribs connected by narrow horizontal ribs, which support the two filtering layers and provide as flow channels for fluid that passes through the high efficiency single layer.

The bag filter is connected to the top of the main central inlet and the single layer is connected to a middle platform on the main central inlet. With a proper balance of inlet areas, fluid will flow through the central inlet into the bag filter and through the smaller inlet holes into the single layer filter.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
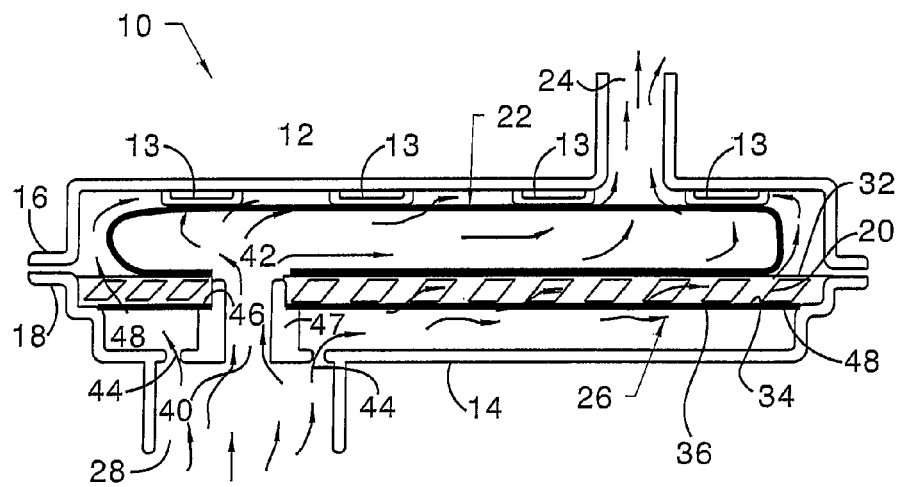
FIG. 1 is a cross sectional view of a suction filter.

Referring now to the drawings, there is illustrated in FIG. 1 a suction filter 10 that includes an upper housing 12 provided with internal supporting ribs 13, a lower housing 14 secured to the upper housing at peripheral flanges 16, 18, a separator grid 20 located in the lower housing between a coarse media bag 22, located in the upper housing between an outlet 24 and the separator grid, and a fine media 26 located in the lower housing between a passageway 28 and the separator grid.

Preferably, the separator grid 20 is a molded component comprising canted ribs 32 connected by narrow horizontal ribs 32, 36, which support the two filtering layers and provide flow channels for fluid that passes through the high efficiency, fine media layer 26. A lower surface of the coarse media bag 22 contacts a surface of the upper ribs 32 of the separator grid 20, and an upper surface of the coarse media contacts the lower surface of internal supporting ribs 13. An upper surface 34 of the fine media 26 contacts the surface of the lower ribs 32 of the separator grid 20.

A first inlet 40, aligned with passageway 28, directs incoming fluid through an opening 42 in the coarse media bag 22 and inlet 40 to the interior of the coarse media bag.

Fluid flow through passageway 28 enters the first inlet 40 and a second inlet 44. One flow path is through inlet 40 and the coarse media bag 22. A second flow path is through inlet 44 and the fine media 26. The separator grid 20, which maintains a flow passageway between the fine media 26 and the bag media 22, provides support for both media 22 and 26.

Flow passage to outlet 24 is maintained open by passages between the upper surface of coarse media bag 22 and internal supporting ribs 13.

Figure 2:
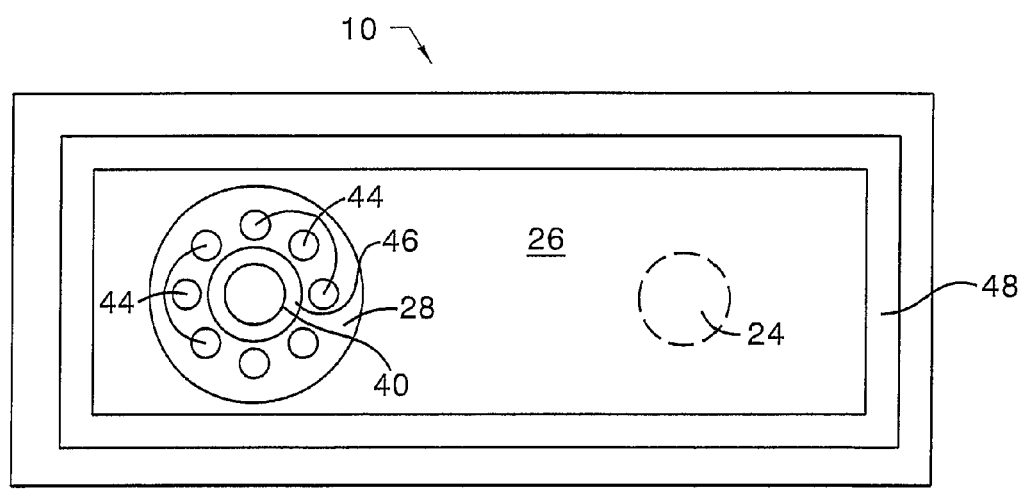
FIG. 2 is bottom view of the suction filter of FIG. 1.

FIG. 2 shows that passageway 28 leads to the first inlet 40, which directs fluid into the bag media 22, and the a second inlet 44, which comprises a series of angularly spaced holes, which direct incoming fluid to the fine media 26. Although FIG. 2 illustrates an arrangement with eight secondary inlet holes 44, any number of holes can be used to feed the fine media 26.

In the embodiment of FIGS. 1 and 2, the fine media 26 and separator grid 20 are both supported on a ledge 46 formed on a fitting 47 in which the inlet 40 is formed. A ledge 48 formed on the lower housing 14 also supports the fine media 26 and separator grid 20 on the housing 14.

Preferably fine media 26 and bag media 22 are secured to separator grid 20 by ultrasonic welding around the periphery of the opening 42 and the separator grid opening where fitting 47 is located.

Figure 3:
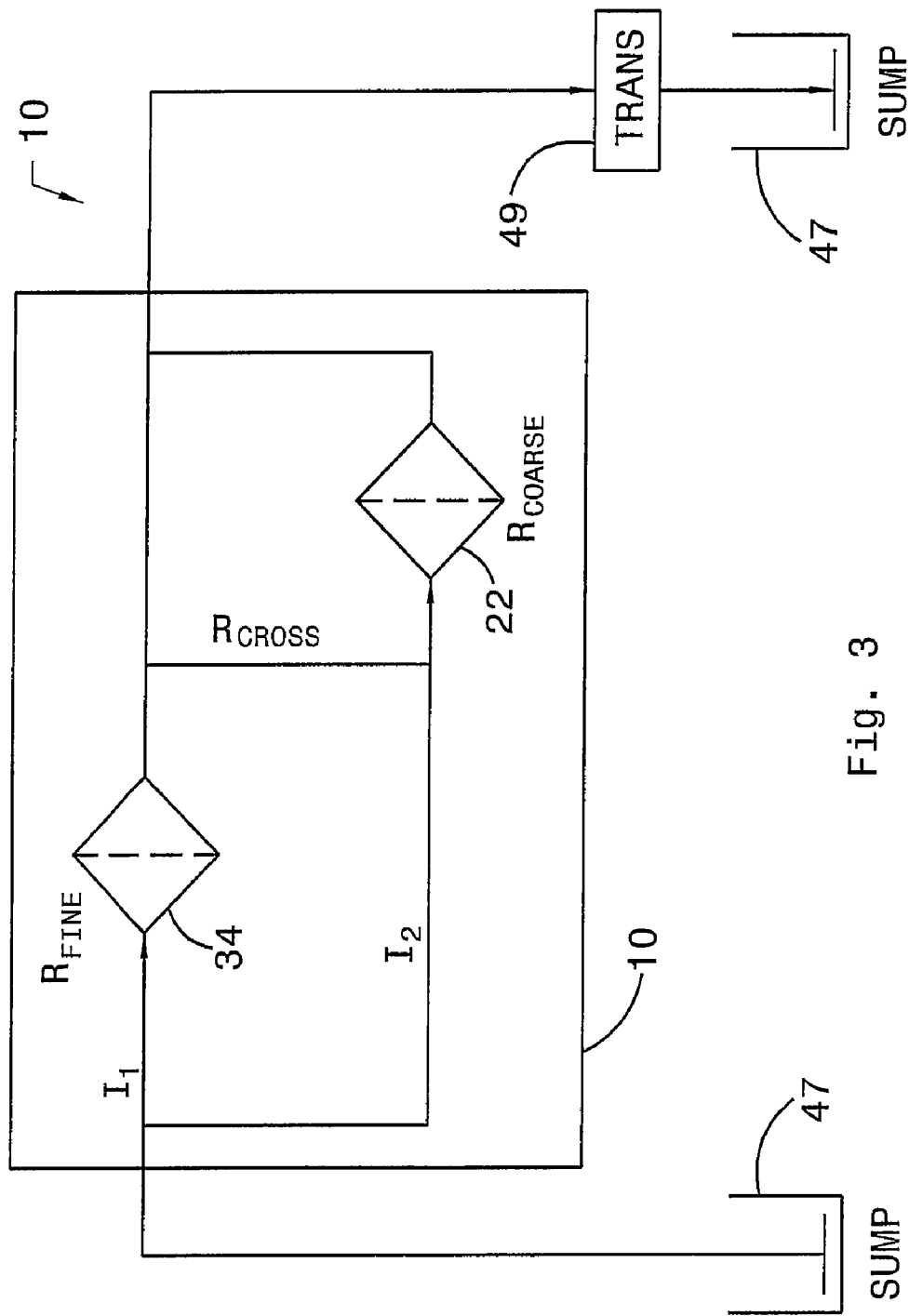
FIG. 3 is a schematic diagram that illustrates parallel fluid flow paths through the fine media filter and coarse media filter in the suction filter of FIG. 1.

FIG. 3 is a schematic diagram illustrating parallel fluid flow paths through the fine media filter 34 and coarse media filter 22 in suction filter 10, which draws fluid from a fluid sump 47 and returns fluid through a transmission 49 to sump. The flow resistance between the flow paths $R_{CROSS}$ is negligible and can be disregarded.

The variables of filtration hydraulic circuits are analogous to electrical variables of an electric circuit, and their relationships can be expressed in equations that correspond to the equations of Kirchhoff's voltage laws when considering the following analogies:

Voltage and Pressure Drop (PD)
Current and Flow Rate (Q)
Electric Resistance and Flow Resistance In the schematic diagram of FIG. 3, formulas (1) and (2) can be used to express flow through the fine media filter 34.

$$\begin{aligned} PD_{system} + (R_1)(I_1) &= 0 \\ \text{Subtract } PD_{system} + (R_2)(I_2) &= 0 \\ \hline (R_1)(I_1) - (R_2)(I_2) &= 0 \\ (R_1)(I_1) &= (R_2)(I_2) \end{aligned} \quad (1)$$

Substituting hydraulic circuit variables for their corresponding electric variables in equation (1)

$$(R_{FINE})(Q_{FINE}) = (R_{COARSE})(Q_{COARSE}) \quad (2)$$

In the dual-inlet, dual-media filter 10, the fine filter 26 has a resistance between 4× and 10× the resistance of the coarse media filter 22, depending on the media selected. If the flow resistance of the fine filter 26 is large, flow will always be present through the fine filter, provided its resistance does not approach infinity. Note that a new factor, defined as Media Resistance Factor ($K_{MR}$) has been defined and is simply a ratio of the flow resistance of the coarse media 22 and fine media 26. Values for $K_{MR}$ range between 0, when the coarse media is relatively restrictive or clogged, and 1 when the flow resistance of the porous media 26 is similar to that of the coarse media 22.

$$(Q_{FINE}) = (R_{COARSE})(Q_{COARSE})/(R_{FINE})$$

$$(Q_{FINE}) = [(R_{COARSE})/(R_{FINE})](Q_{COARSE})$$

$$(Q_{FINE}) = (K_{MR})(Q_{COARSE})$$

Figure 4:
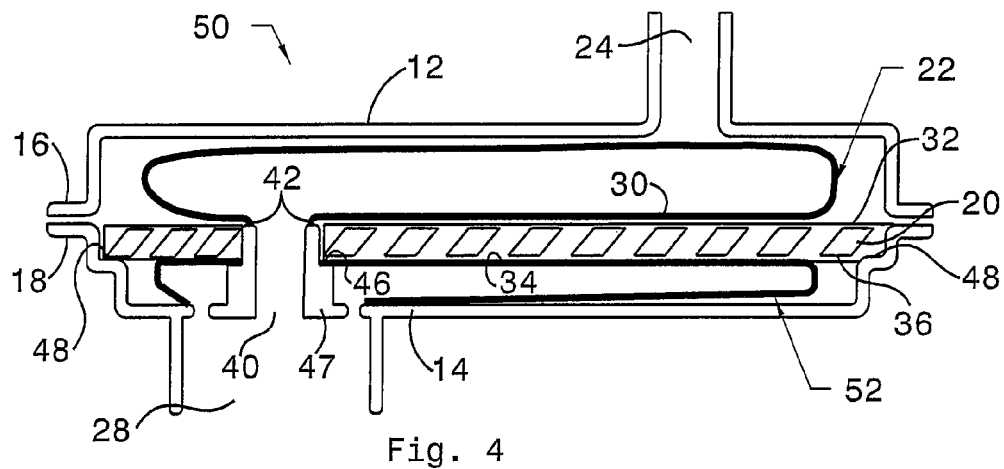
FIG. 4 is a cross sectional view of a suction filter that includes two filter bags.

FIG. 4 illustrates a suction filter 50 that includes two filter bags, the coarse medial bag 22 and a fine media bag 52, instead of the single layer filter 26. While suction filter 50 provides additional media packaging density for the high efficiency option, it also requires additional thickness. Preferably fine media bag 52 and bag media 22 are secured to separator grid 20 by ultrasonic welding around the periphery of opening 42 and the opening of the separator grid 20 where fitting 47 is located.

Figure 5:
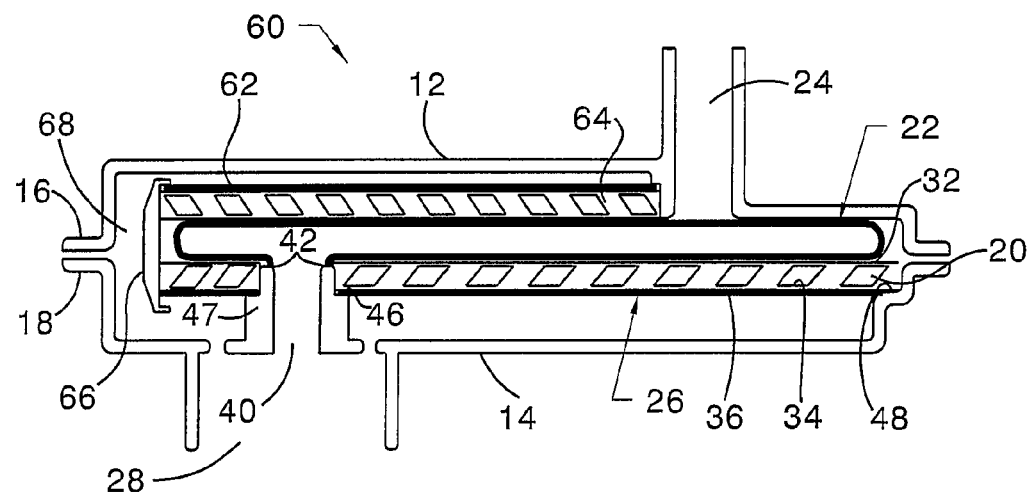
FIG. 5 is a cross sectional view of a suction filter that includes two layers of fine filtration media.

FIG. 5 illustrates a suction filter 60 that adds a second, upper layer of fine filtration media 62 between the coarse media bag 22 and upper housing 12. An additional upper separation grid 64 is supported on a fitting 66, which engages the edges of the lower separation grid 20 and the upper separation grid 64, and provides a wall of a channel 68.

Much like the two bag filter 50, suction filter 60 requires additional thickness and also requires an additional channel 68, which directs and carries incoming fluid to the upper layer of fine filtration media 62. Preferably fine media 26 and bag media 22 are secured to separator grid 20 by ultrasonic welding around the periphery of opening 42 and the opening of the separator grid 20 where fitting 47 is located.

Figure 6:
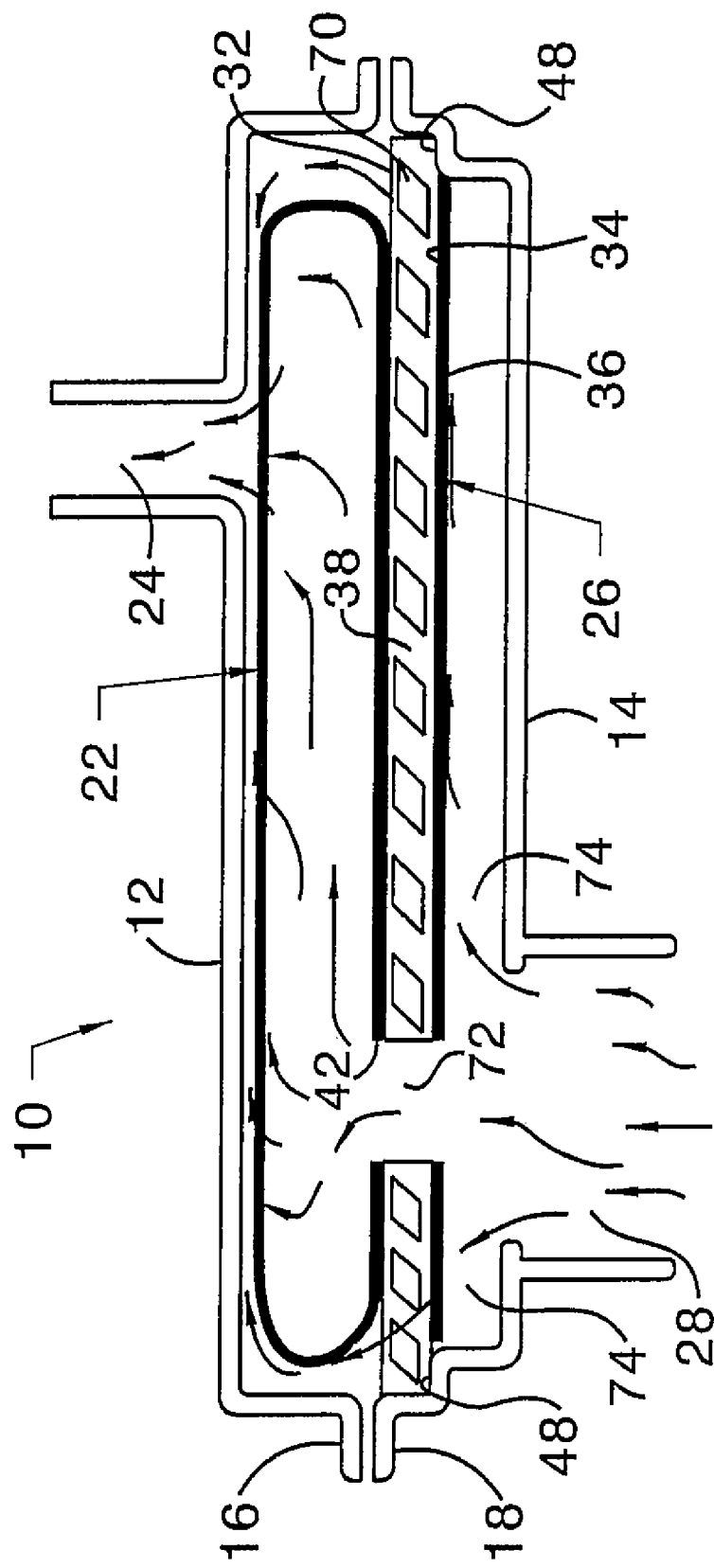
FIG. 6 is a cross sectional view of a suction filter in which the separator grid is formed with the first inlet.

FIG. 6 is a cross sectional view of a suction filter in which the separator grid 70 is formed with a first inlet 72 that carries fluid through the separator grid 70 into the bag media 22. Fitting 47 of the embodiment of FIG. 1 is deleted. Fluid also flows through a second opening 74 to the fine media 26. Passageway 28 communicates with first and second inlets 72, 74. Fluid flows through inlet 74 and separator grid 70 and along the outside of bag media 22 to outlet 24. Fluid flows through inlet 72 into and through bag media 22 to the outlet 24.

Preferably, fine media 26 and bag media 22 are secured to separator grid 70 by ultrasonic welding around the periphery of the first inlet 72.

In accordance with the provisions of the patent statutes, the preferred embodiment has been described. However, it should be noted that the alternate embodiments can be practiced otherwise than as specifically illustrated and described.

The invention claimed is:

1. A filter assembly for an automatic transmission, comprising
    a housing including a first inlet and a second inlet comprising spaced holes arranged around the first inlet, through which fluid enters the housing from a common source, and an outlet;
    a first media filter located in a first fluid flow path between the first inlet and the outlet; and
    a second media filter located in a second fluid flow path between the second inlet and the outlet.

2. The filter assembly of claim 1 further comprising a separator grid located within the housing for supporting the first media filter on the housing, directing fluid exiting the second media filter to flow to the outlet, and limiting fluid flow exiting the second media filter from flowing through the first media filter to the outlet.

3. The filter assembly of claim 1 wherein the first media filter is a first bag that includes a first opening secured to the first inlet and through which fluid enters the first bag from the first inlet to the outlet.

4. The filter assembly of claim 1 wherein the second media filter is a sheet that includes a second opening secured to the second inlet and through which fluid flows from the second inlet to the outlet.

5. The filter assembly of claim 1 wherein the second media filter is a second bag that includes a second opening secured to the second inlet and through which fluid enters the second bag from the second inlet to the outlet.

6. The filter assembly of claim 1 wherein:
the housing includes a passage through which fluid flows to the first inlet and the second inlet.

7. A filter assembly for an automatic transmission, comprising:
a lower housing containing a first filter, formed with a ledge;
an upper housing containing a second filter;
a fitting forming first and second inlets through which fluid enters from a common source, and a second ledge;
an outlet;
a grid supported on the ledge and the second ledge, supporting the second filter and directing fluid exiting the first filter toward the outlet.

8. The filter assembly of claim 7 wherein the grid limits said fluid flow exiting the second filter from flowing through the first filter.

9. The filter assembly of claim 7,
wherein the first filter is a first bag that includes a first opening secured to the fitting and through which fluid enters the first bag from the first inlet.

10. The filter assembly of claim 7,
wherein the second filter comprises a sheet contacting the grid and including a second opening that contacts the second ledge and through which second opening fluid flows from the second inlet to the outlet.

11. The filter assembly of claim 7 further comprising:
wherein the second filter comprises a second bag that includes a second opening secured to the second inlet and through which fluid enters the second bag from the second inlet.

12. A filter assembly for filtering contaminants from automatic transmission fluid, comprising:
a housing including a first housing portion, a second housing portion secured to the first housing portion and formed with a ledge, a first inlet and a second inlet, the second inlet comprising holes arranged around the first inlet, through which fluid enters the housing, and an outlet, through which fluid exits the housing;
a first media filter located within the housing in a first fluid flow path between the first inlet and the outlet;
a second media filter located within the housing in a second fluid flow path between the second inlet and the outlet;
a third media filter located within the housing in a second fluid flow path between the second inlet and the outlet;
a first separator grid located within the housing, supported on the ledge, and supporting the first media filter thereon, and directing fluid exiting the second media filter to flow to the outlet; and
a second separator grid located within and supported on the housing, supporting the third media filter thereon, and directing fluid exiting the third media filter to flow to the outlet.

13. The filter assembly of claim 12 wherein the first separator grid limits fluid flow exiting the second media filter from flowing through the first media filter.

14. The filter assembly of claim 12 wherein the second separator grid limits fluid flow exiting the second media filter from flowing through the first media filter.

15. The filter assembly of claim 12, further comprising a first fitting formed with the first inlet and a second ledge, on which second ledge the first separator grid is supported.

16. The filter assembly of claim 12, further comprising:
a first fitting formed with the first inlet and a second ledge, on which second ledge the first separator grid is supported; and
wherein the first media filter is a first bag that includes a first opening secured to the first fitting and through which fluid enters the first bag from the first inlet.

17. The filter assembly of claim 12, further comprising:
a first fitting formed with the first inlet and a second ledge, on which second ledge the first separator grid is supported; and
wherein the second media filter comprises a sheet contacting the first separator grid and including a second opening that contacts the second ledge and through which second opening fluid flows from the second inlet to the outlet.

18. The filter assembly of claim 12 further comprising:
a first fitting formed with the first inlet and a second ledge, on which second ledge the first separator grid is supported; and
wherein the second media filter comprises a second bag that includes a second opening secured to the second inlet and through which fluid enters the second bag from the second inlet to the outlet.

19. The filter assembly of claim 12 further comprising:
a first fitting formed with the first inlet and a second ledge, on which second ledge the first separator grid is supported;
a second fitting engaging the first separator grid and the second separator grid; and
wherein the second media filter comprises a first sheet contacting the first separator grid and including a second opening that contacts the second ledge and through which second opening fluid flows from the second inlet to the outlet; and
wherein the third media filter comprises a second sheet contacting the second separator grid and through which second sheet fluid flows from the second inlet to the outlet.

* * * * *